July 9, 1963 F. KLOPP ETAL 3,096,687
MILLING MACHINE
Filed May 8, 1961 3 Sheets-Sheet 1
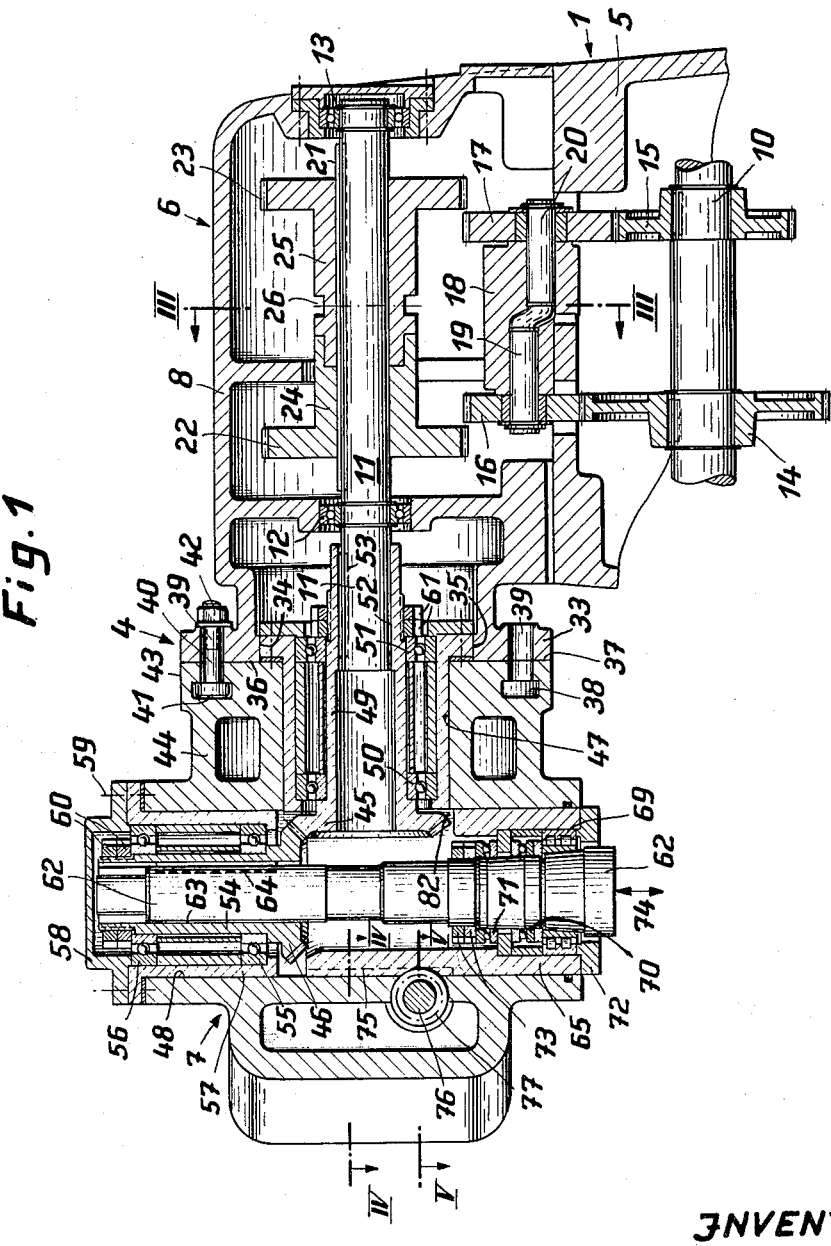
INVENTORS
FRIEDRICH KLOPP
FRIEDRICH KLOPP Jr.
FRIEDHELM LESSENICH
BY
Harness, Dickey & Pierce
ATTORNEYS

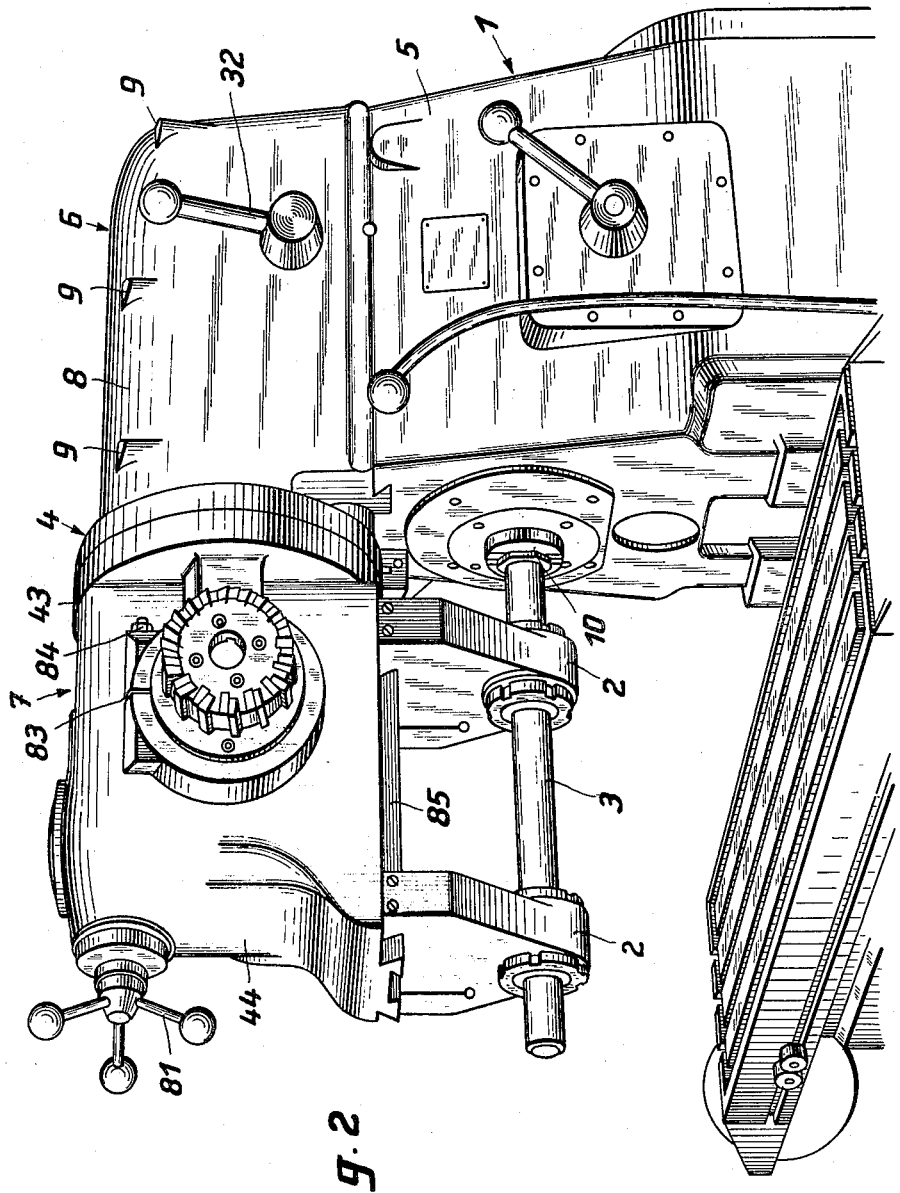

July 9, 1963　　　F. KLOPP ETAL　　　3,096,687
MILLING MACHINE
Filed May 8, 1961　　　　　　　　　3 Sheets-Sheet 3
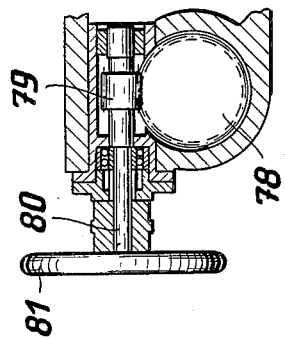
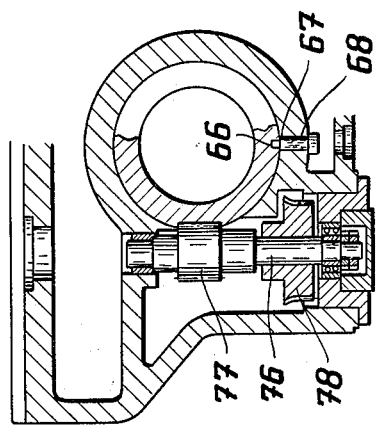
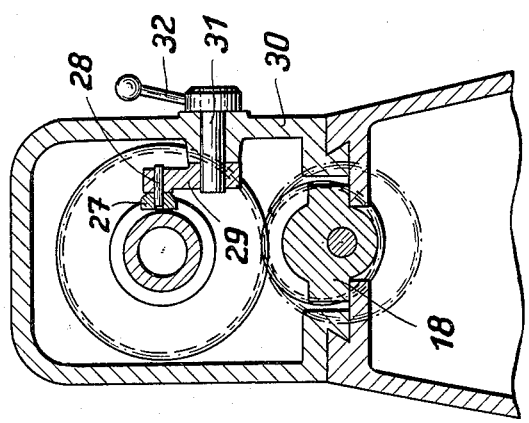
INVENTORS
FRIEDRICH KLOPP
FRIEDRICH KLOPP Jr.
FRIEDHELM LESSENICH
BY
Harness, Dickey & Pierce
ATTORNEYS United States Patent Office 3,096,687
Patented July 9, 1963

3,096,687
MILLING MACHINE
Friedrich Klopp, Friedrich Klopp, Jr., and Friedhelm Lessenich, all of Solingen-Wald, Germany, assignors to Klopp-Werke G.m.b.H., Solingen-Wald, Germany
Filed May 8, 1961, Ser. No. 108,611
Claims priority, application Germany May 10, 1960
9 Claims. (Cl. 90—17)

The invention relates to milling machines and in particular relates to such machines as are suitable both for horizontal and vertical milling.

Vertical milling on a horizontal milling machine is known and is made possible by fitting a vertical milling head to the column of the machine, such vertical milling head being disposed on a centre piece concentric with the milling spindle, so that the end of the milling spindle is drivingly connected to the additional head.

The fitting of the additional head is difficult and time consuming and, due to its appreciable weight, the head requires to be handled by more than one person.

A further disadvantage lies in the fact that when the additional head is fitted the distance between the work table and tool is very small and frequently the extent of vertical adjustment of the table is insufficient for the machine to be applied to the working of bulky pieces.

It is among the objects of the present invention to avoid, at least in part, the aforesaid disadvantages and to provide a milling machine that can be set up with full capacity for vertical as well as horizontal milling. On the machine constructed in accordance with the invention the adjustment from vertical to horizontal milling, and vice versa, may easily and quickly be effected by a single operative and the alteration can, if so desired, be made without removing a work piece already in position upon the work table. In this manner the working is made easier and the degree of accuracy increased.

A further advantage lies in the fact that the r.p.m. of the vertical milling spindle is considerably increased relative to the horizontal milling spindle so that the cutting speed of the tool can be set between narrower limits than is possible for horizontal milling.

Thus according to the present invention the arm arranged on the machine column and which carries the support bearings of the cutter arbor in a normal horizontal milling machine is replaced by a mechanism driven by the horizontal milling spindle, said mechanism driving a vertical milling head swivel mounted for motion about an axis lying parallel to the horizontal milling spindle, said head carrying support bearings for the cutter arbor for horizontal milling.

By virtue of this arrangement there is adequate working room between the work table and the tool fastened to the vertical milling head for milling bulky workpieces.

In order to change over from vertical to horizontal milling it is necessary only to swivel the milling head in such a way that the support bearings fastened thereto are aligned with the horizontal milling spindle, whereupon the milling arbor with the tool is placed in the support bearings and can be connected with the horizontal milling spindle.

An advantageous embodiment of the subject matter of the invention provides that the mechanism has a housing in which is carried a driving shaft for the milling head lying parallel to the horizontal milling spindle, said driving shaft being driven by the horizontal milling spindle over a step change drive with an idling position. By means of such an arrangement it is possible, at least, to double the r.p.m. of the vertical spindle relative to the horizontal spindle or, alternatively, to disconnect the drive as during horizontal milling.

In another embodiment of the invention the mechanism housing has a round flange, concentric with the driving shaft, which is provided with a reception boring suitable for centering the vertical milling head as well as means of securing the same.

In this connection the means for securing the vertical milling head consists of several set screws which protrude through holes provided in the flange of the mechanism housing and grip with four sided heads in an annular T shaped groove provided in the milling head concentric with the driving shaft.

In further embodiment the invention provides that the vertical milling spindle is driven by a pair of bevel gears and is carried in an axially moveable spindle or tail stock sleeve so that height adjustment of the milling tool can be obtained in a manner known per se.

It is expedient for the spindle sleeve guide to have an axial channel therein which receives a set screw thereby to hold said guide as a clamp onto the sleeve.

The invention further provides that the milling head has a dovetail guide on which the support bearings for the horizontal milling mandrel can be adjusted and secured in known manner.

The invention will now be described further, by way of example only with reference to the accompanying drawings illustrating one particular embodiment thereof and in which:

FIG. 1, a vertical longitudinal section through the upper part of a horizontal and vertical milling machine according to the invention;

FIG. 2, a perspective view of the milling machine in the position for horizontal milling;

FIG. 3, a section on line III—III of FIG. 1;

FIG. 4, a part section on line IV—IV of FIG. 1;

FIG. 5, a part section on line V—V of FIG. 1.

Referring now to the drawings a conventional horizontal milling machine 1 has the arm carrying the support bearings 2 for the cutting arbor 3 removed and replaced by the vertical and horizontal milling apparatus according to the invention and denoted as a whole by reference numeral 4.

The vertical and horizontal milling apparatus consists of a mechanism 6 firmly arranged on machine column 5 and a swivelling and securable milling head 7 attached thereto.

First of all the mechanism 6 will be described with reference to FIG. 1.

Within housing 8 firmly attached to the machine column 5 by means of screws 9 is a drive shaft 11 carried in ball bearings 12 and 13 lying parallel to the horizontal milling spindle 10.

The driving shaft 11 is drivingly connected with the horizontal milling spindle 10 through two gear wheels 14 and 15 having different numbers of teeth. The gear wheels 14 and 15 mesh with intermediate or idler gear wheels 16 and 17 which revolve freely on pegs 19 and 20 carried in bearing block 18.

The bearing block 18 is fastened on machine column 5 and projects into the mechanism housing 8, the underside of said housing being open.

Two gear wheels 22 and 23 keyed to the shaft 11 as at 21 for axial motion relative thereto and are firmly connected one with the other by their hubs 24 and 25.

The distance between gear wheels 22 and 23 is such that they are, when in a middle position, out of mesh with intermediate or idler gear wheels 16 and 17.

By movement, the firmly connected gear wheels 22 and 23 can be meshed, either gear wheel 22 with intermediate gear wheel 16, or gear wheel 23 with intermediate gear wheel 17.

In view of the somewhat unlimited possible variation of speed ratio between the gear wheels 14 and 15 on horizontal milling spindle 10 and the gear wheels 22 and 23 on driving shaft 11, the latter can be driven with twice as many velocity stages as the horizontal milling spindle 10.

In general six velocity stages are provided for the horizontal milling spindle 10 so that the driving shaft can be driven with twelve velocity stages.

For switching the moveable gear wheels 22 and 23 on driving shaft 11, an annular groove 26 is provided in the hub 25 of gear wheel 23, with which, as it is to be seen in FIG. 3, switching block 27 engages, and which is rotatably carried on a peg 28 at the free end of switch arm 29. The switch arm 29 is firmly fastened on a peg 31 rotatably mounted in the side wall 30 of the housing 8, said peg carrying, outwardly of the housing 8 a switch lever 32. It is obvious that by swivelling the lever 32 one or other gear wheel 22 or 23 will, according to choice, be out of engagement.

The front end of the mechanism housing 8 is provided with an outwardly directed annular flange 33, said flange 33 being concentric with the driving shaft 11, the bore 34 of said flange 33 receiving in rotatable manner a projection 35 of the milling head 7.

The milling head 7 lies with an end surface 36 in abutment with the face 37 of the flange 33. In the end surface 36 of milling head 7 an annular T groove 38 is provided, whilst in flange 33 of mechanism housing 8 several evenly spaced holes 39 for set screws 40 are provided, which set screws have four sided heads 41 arranged in the T groove 38 of milling head 7.

A scale of degrees is marked on the circumference of flange 33 on mechanism housing 8, whilst a setting mark is provided on the circumference of a part 43 of milling head 7 which lies against flange 33.

By this means the milling head 7, which is to be more particularly described hereafter, can be swivelled and secured in any desired angular position.

The milling head 7 comprises housing 44 carrying, in bearings 47 and 48, two interengaged bevel gears 45, 46 said bevel gears 45, 46 being mounted for rotation about two mutually perpendicular axes.

The bevel gear wheel 45 is carried in bearing 47, which lies concentric with central projection 35, having its hub in the two ball bearings 50 and 51. The two annular nuts 61 screwed on the end of bevel gear hub 49 serve to set the axial bearing play.

Driving shaft 11 engages the bore 52 of hub 49 is keyed to such bore by means of element 53.

The bevel gear wheel 46 is carried by its hub 54 in the two ball bearings 55 and 56 arranged in a bush 57 set in bore 48 and covered by bearing cap 58. The cap 58 together with bearing bush 57 is secured to milling head housing 44 by means of screws 59. For setting the axial bearing play two lock nuts 60 are screwed on the end of bevel gear hub 54.

The top end of vertical milling spindle 62 engages the through bore 63 of bevel gear 46, said spindle 62 being keyed to said bore 63 by element 64.

The lower end of vertical milling spindle 62 is carried in a spindle or tail stock sleeve 65, which is arranged in boring 48 (see FIG. 5), said sleeve 65 being axially moveable relative to the boring 48 but being prevented from rotating therein by the shank 67 of a bolt 68 engaging a through hole 66. The bearing is provided by an adjustable double roller bearing 69 and two ball bearing assemblies 70 and 71 held in the lower end of spindle sleeve 65 by bearing cap 72 through which the vertical milling spindle 62 passes.

The two nuts 73 abutting the upper bearing 71 serve to adjust the axial bearing play of vertical milling spindle 62.

The spindle or tail stock sleeve 65 having the vertical milling spindle 62 associated therewith can be moved in the direction of arrow 74. The spindle or tail stock sleeve 65 has for this purpose, projecting radially of its circumference, a rack 75, said rack 75 being engaged by a pinion 77 mounted on shaft 76 carried by the housing 44.

There is further fastened on pinion shaft 76 a worm wheel 78 which meshes with a worm 79 carried in housing 44.

The end of shaft 80 carrying worm 79 protrudes out of housing 44 and a hand wheel 81 is affixed thereto.

By turning the hand wheel the spindle or tail stock sleeve 65 can be moved up and down. The spindle or tail stock sleeve 65 has a recess 82 to receive the bevel wheel 45.

To secure the spindle or tail stock sleeve 65 in the height chosen from time to time, the under-side of housing 44 has a slot 83 which can be closed in a manner known per se, by set screw 84, onto bore 48 which passes through the whole housing, as is to be seen in FIG. 2.

It can also be seen from FIG. 2 that the side face of housing 44 which lies parallel to the axis of the vertical milling spindle 62 and the driving shaft 11, is provided with a dovetail guide 85 which serves as an adjustable receiver for support bearings 2 of the horizontal milling mandrel.

To set milling head 7 in the suitable position for vertical milling, after removal of the horizontal milling mandrel, it is simply necessary to loosen nut 42 of set screw 40, whereupon the milling head 7 can be set in the desired position in which it is then secured by tightening up nut 42.

The invention produces for the first time a milling machine which as a high quality machine can be changed by easily worked handles, for vertical as well as horizontal milling.

The invention is by no means to be confined to the embodiment hereinbefore described as alterations will readily present themselves to one skilled in the art.

Such alterations could for example arise if a horizontal milling machine of any construction is to be filled with the horizontal-vertical-milling apparatus according to the invention.

What we claim is:

1. A milling machine having in combination a horizontal shaft, a milling head swivelly mounted thereon, said milling head comprising a horizontal cutter arbor and a milling spindle, said cutter arbor extending parallel to said shaft, the axis of said milling spindle and the axis of said shaft lying in a first plane, the axis of said cutter arbor and the axis of said shaft lying in a second plane extending normal to said first plane, means for selectively securing the milling head in its swivel position, transmission means for transmission of a driving force including a transmission spindle extending parallel to said arbor, first and second gearing, said cutter arbor being movable, by swivelling said milling head, into alignment with said transmission spindle and connectable thereto for driving purposes, and selective means for drivably connecting said first and second gearing, said second gearing being drivably connected to said milling spindle.

2. A milling machine having in combination a horizontal first shaft, a milling head swivelly mounted thereon, said milling head comprising a horizontal cutter arbor and a milling spindle, said cutter arbor extending parallel to said first shaft, the axis of said milling spindle and the axis of said first shaft lying in a first plane, the axis of said cutter arbor and the axis of said first shaft lying in a second plane extending normal to said first plane, means for selectively securing the milling head in its swivel position, transmission means for transmission of a driving force including a transmission spindle extending parallel to said arbor, first and second gearing, said first gearing comprising two different sized gears mounted in a spaced relation on said transmission spindle and being driven thereby, said second gearing comprising two different sized gears mounted on said second shaft for rotation therewith but being axially shiftable thereon, said cutter arbor being movable, by swivelling said milling head, into alignment with said transmission spindle and connectable thereto for driving purposes, and means for selectively bringing one of the shiftable gears of the second gearing into mesh with a respective gear of the first gearing, said second gearing being drivably connected to said milling spindle.

3. A milling machine according to claim 2 in which said second gearing is located in a housing which has a circular flange concentric with the first and the second shaft, the first shaft having a through bore which forms a bearing for the second shaft, the milling head having a circular flange complementary to said first flange, one of the flanges having an annular T-shaped groove which is concentric with said shafts and which is engaged by set screws projecting through holes in the other one of said flanges.

4. A milling machine having in combination a horizontal shaft, a milling head swivelly mounted thereon, said milling head comprising a horizontal cutter arbor and a milling spindle, said cutter arbor extending parallel to said shaft, the axis of said milling spindle and the axis of said shaft lying in a first plane, the axis of said cutter arbor and the axis of said shaft lying in a second plane extending normal to said first plane, means for selectively securing the milling head in its swivel position, transmission means for transmission of a driving force including a transmission spindle extending parallel to said arbor, first and a second gearing, said cutter arbor being movable, by swivelling said milling head, into alignment with said transmission spindle and connectable thereto for driving purposes, and selective means for drivably connecting said first and said second gearing, said second gearing being drivably connected by means of a pair of bevel gears to said milling spindle, the milling spindle being carried in a spindle sleeve adapted for axial movement.

5. A milling machine according to claim 4, further provided with guide means for said spindle sleeve having an axially extending slot, and a set screw for securing said spindle sleeve within said guide means by closing said slot.

6. A milling machine having in combination a horizontal shaft, a milling head swivelly mounted thereon, said milling head comprising a horizontal cutter arbor and a milling spindle, said cutter arbor extending parallel to said shaft, the axis of said milling spindle and the axis of said shaft lying in a first plane, the axis of said cutter arbor and the axis of said shaft lying in a second plane extending normal to said first plane, means for selectively securing the milling head in its swivel position, transmission means for transmission of a driving force including a spindle extending parallel to said arbor, first and second gearing, said cutter arbor being carried by supporting bearings which are axially movable in a dovetail guide, said cutter arbor being movable, by swivelling said milling head, into alignment with said transmission spindle and connectable thereto for driving purposes, and selective means for drivably connecting said first and said second gearing, said second gearing being drivably connected to said milling spindle.

7. A milling machine having in combination a supporting structure forming a housing with a front face and a top side, transmission means for transmitting a driving force comprising a horizontal spindle extending perpendicular to said front face, said transmission means being supported in said supporting structure, a gearing box containing gearing and having a bottom and a plane front face, the bottom being positioned on the top side of said supporting structure which thereby supports the gearing box, a milling head supported at the front face of said gearing box and rotatably adjustable about a swivel axis extending parallel to said spindle and perpendicular to said plane front face, means for securing said milling head in its rotational position, a horizontal cutter arbor supported parallel to said spindle on said milling head, a milling spindle extending through said milling head, means for selectively connecting said transmission means and said gearing, the latter being drivably connected with said milling spindle, the cutter arbor being connectable, for the transmission of a driving force thereto, to said spindle by adjusting the milling head, said swivel axis and the axis of said milling spindle both lying in a first plane, said swivel axis and the axis of said cutter arbor lying in a second plane extending normal to said first plane.

8. A milling machine according to claim 7 in which the plane front face of said gearing box is a circular flange engaged by a complementary plane circular flange on the rear side of the milling head.

9. A milling machine according to claim 7 in which the milling head is secured in its rotational position by means of screws.

References Cited in the file of this patent
UNITED STATES PATENTS

| 135,313 | Blaisdell | Jan. 28, 1873 |
| 2,242,445 | Armitage | May 20, 1941 |

FOREIGN PATENTS

| 76,511 | Sweden | Feb. 14, 1933 |
| 433,927 | France | Jan. 19, 1912 |
| 871,510 | France | Apr. 29, 1942 |